Jan. 18, 1927.
L. C. HESTER
PLOW
Filed Oct. 18, 1924
1,614,673
2 Sheets-Sheet 1
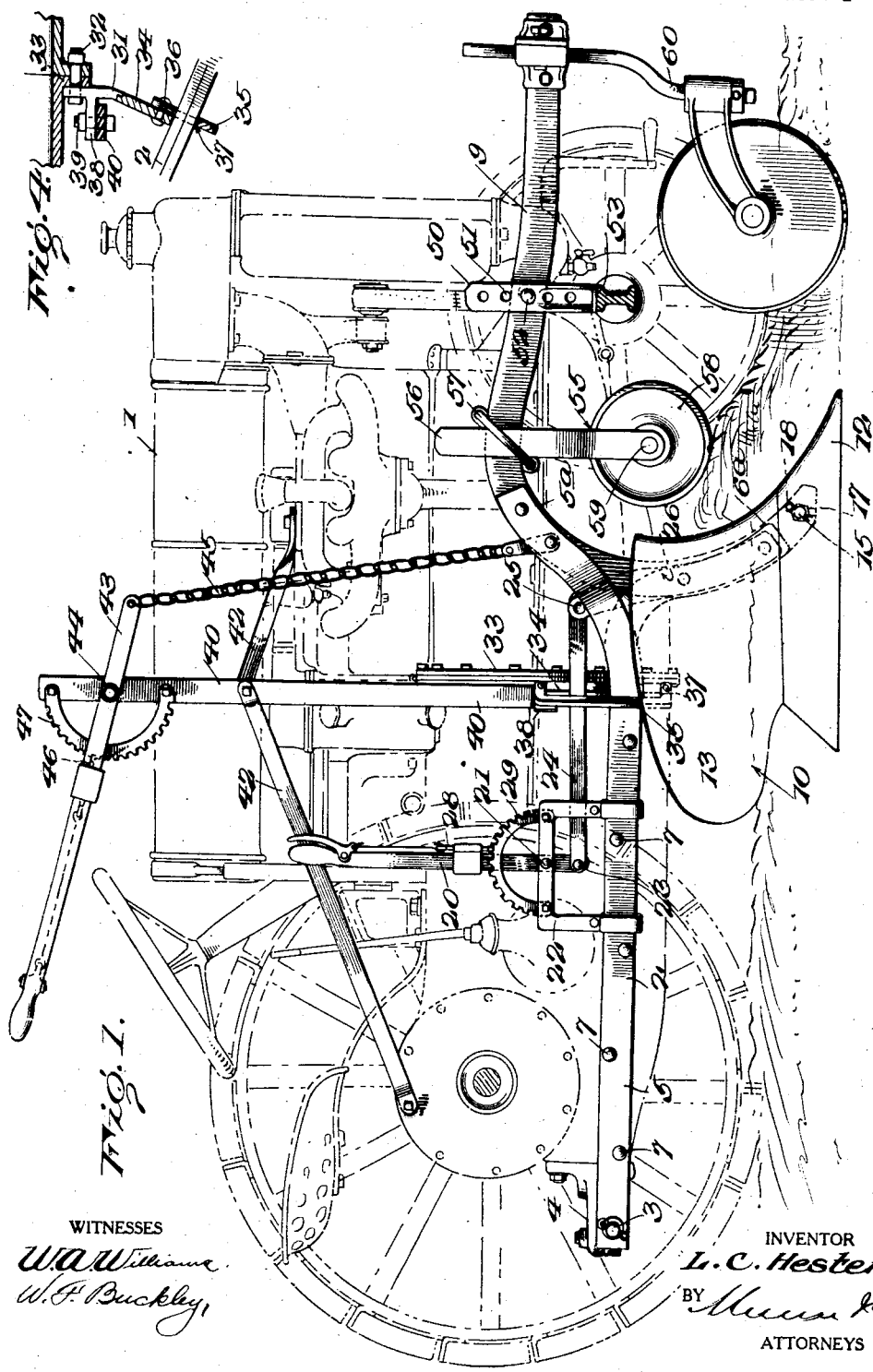
WITNESSES
INVENTOR
L. C. Hester.
BY
ATTORNEYS

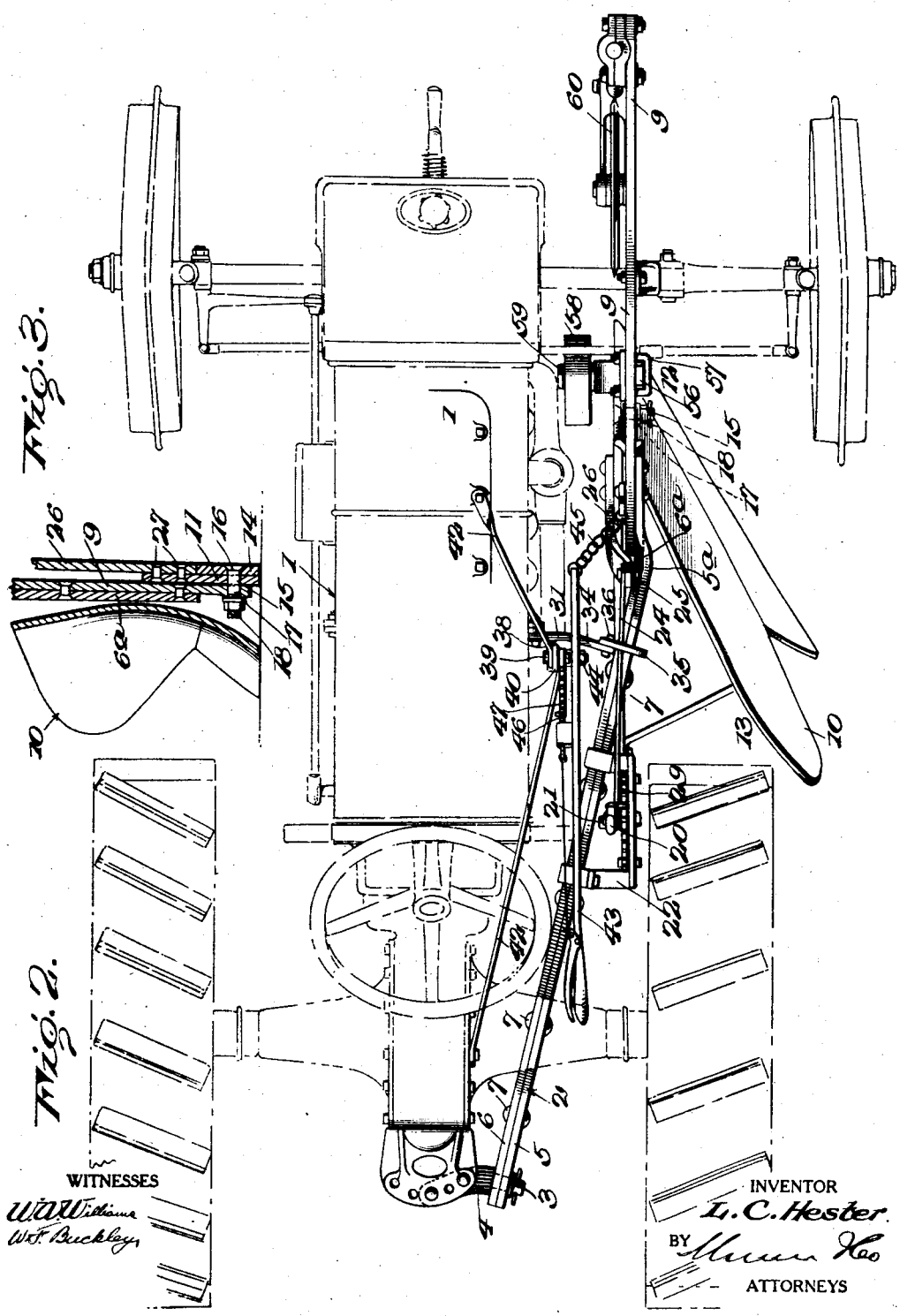

Patented Jan. 18, 1927.

1,614,673

UNITED STATES PATENT OFFICE.

LEVI C. HESTER, OF WILLISTON, FLORIDA.

PLOW.

Application filed October 18, 1924. Serial No. 744,519.

This invention relates to plows of the type especially designed for use on motor vehicles, such as the "Fordson" tractor or the like.

The object of the invention resides in the provision of a plow of this character which may be organized with the tractor in such manner as to take advantage of the powerful pushing or propelling action of the tractor so as to make powerful and speedy plowing possible to desired depth entirely practical and which also maintains the plow with its point and heel in a plane parallel to the mean surface of the ground at any desired depth of cut.

Another object resides in the provision of a simple and durable construction which is reliable and efficient in operation, readily controlled and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification and in which—

Figure 1 is a view in side elevation showing one embodiment of the invention,

Figure 2 is a top plan view,

Figure 3 is a detail view in section showing one mode of pivoting the plow on its beam, and Figure 4 is a detail view taken approximately on line 4—4 of Figure 1.

Referring to the drawings the numeral 1 designates a "Fordson" tractor. A push bar designated generally at 2 is pivotally connected at its rear end as at 3 to the hitch 4 of the tractor so that the push bar is moved forwardly with the tractor but may be adjusted angularly about its pivot 3. The push bar 2 is made up of two flat metallic bars designated at 5 and 6 which are held together in face to face relation for the major portion of their lengths by means of rivets 7. At the forward ends of the bars 5 and 6 they diverge from each other as shown to advantage in Figure 1 to provide attaching portions 5ª and 6ª. The attaching portion 5ª is offset inwardly as shown at 8 in Figure 1 so that the two attaching portions 5ª and 6ª are located in the same vertical plane.

A plow beam 9 is fastened to the attaching portions 5ª and 6ª and preferably the plow beam is engaged with the inner faces of the attaching portions. A moldboard plow 10 is provided and comprises the conventional frame or base 11 (see Figure 3) which carries the point 12, the moldboard 13 and the landside 14. The plow 10 is pivotally mounted on the beam 9 by means of a pivot bolt 15 which has its head 16 countersunk in the landside 14 and which has its shank extended through bolt holes provided in the landside 14, the frame or base 11 and the beam 9. A nut and washer 17 and cotter pin 18 complete the pivotal mounting of the plow. It is to be noted that the pivot bolt 15 which is the axis of angular movement of the plow is located adjacent the point and midway between the points of cut so that the forces tending to turn the plow are nearly balanced when the plow is in actual operation.

The angular movement of the plow and its position is controlled by means of a hand lever 20 pivoted as at 21 on a bracket 22 carried on the push bar 2 and pivotally connected as at 23 to one end of a connecting rod 24, the opposite end of which connecting rod is pivotally fastened as at 25 to the upper end of an arm 26 which is riveted or otherwise suitably fastened at its lower end to the frame 11 as indicated at 27 in Figure 3. The hand lever 20 carries the conventional grip release and spring pressed detent 28 which coacts with a toothed quadrant 29 fastened on the bracket 22 so that the lever 20 may be releasably held in adjusted position to maintain the plow 10 in any angular adjustment on its pivot. At the same time the hand lever 20 may be readily operated to vary the angular adjustment of the plow 10 on its pivot.

The push bar 2 is constrained to vertical swinging movement about its pivot 3 by means of a guide designated generally at 30 and comprising a plate 31 bolted as at 32 to the flanges 33 of the casing of the tractor. The outer portion of the plate 31 is deflected rearwardly as at 34 so that it will be at right angles to the push bar 2. A U-shaped strap 35 is secured as at 36 to the plate 34 and defines a vertical slot or guide 37 for the push bar.

A supporting lug 38 is integrally formed with or suitably secured to the plate 31 and is fastened as at 39 to the lower end of a standard 40. Brace members 42 complete the support of the standard. A lift lever 43 is fulcrumed as at 44 on the standard and is connected at one end with the beam 9 of the plow by means of a chain 45. A spring pressed and grip or hand release latch or detent 46 is provided on the hand lever 43 and coacts with a toothed quadrant 47 mounted on the standard 40.

With this arrangement the plow may be elevated as desired by manipulating the lift lever 43 and yet the plow may be caused to ride up out of the earth and on to the top of the ground by swinging the hand lever 20 forwardly to tilt the point 12 of the plow upwardly, the chain 45 slacking to permit this action.

The depth of cut of the plow may be controlled by a depth gauge arm 50 having a series of bolt holes 51 therein whereby it may be adjustably fastened to the beam 9 by means of a bolt and nut 52. The lower end of the arm 50 is supported on the front axle of the tractor as at 53.

If the type of depth gauge just described is not employed a roller gauge designated generally at 55 may be utilized and includes an arm 56 adjustably secured to the beam 9 by a clamp 57 and a roller 58 rotatably mounted as at 59 on the lower end of the arm. The arm 56 is disposed on the inner side of the beam and may be curved inwardly if found necessary so that the roller will ride on unplowed ground to control the depth of cut.

A colter designated generally at 60 is carried by the forward end of the plow beam.

With this arrangement the plow 10 may be adjusted angularly about its pivotal connection to the beam 9 to properly position the plow in any vertical adjustment of the push bar 2. It will be noted that when a push bar is employed the plow at the forward end of the same swings in an arc so that when a moldboard plow is utilized a variation in the depth of cut is had at the expense of efficient plowing action since the swinging of the push bar which accompanies the variation in the depth of cut either causes the point 12 of the plow to dip downwardly or to incline upwardly, the heel of the plow moving oppositely with respect to the point. This throws the plow out of the plane parallel to the surface of the ground and impairs the action of the plow. With the present invention a wide range of swing may be given to the push bar to provide for varying depths of cut and at any depth of cut the plow may be adjusted angularly about its pivot to the beam to bring its point and heel into a plane parallel to the surface of the ground to maintain the efficiency of the plow at all times. Moreover, the advantage of the type of beam shown is had and this type of beam is effectively organized with the push bar. An important feature of the invention is believed to reside in the relation of the pivot or axis of swing of the plow on the beam to the cutting edge of the plow for by locating this pivot intermediate the points at which the major cutting occurs the forces tending to turn the plow on its pivot are nearly balanced and but a very slight strain is applied to the arm 26, rod 24, hand lever 20, latch or detent 28 and toothed quadrant 29.

In general the structure of the plow has been simplified and improved to the ends of efficiency and operation and facility in manufacture. It is to be understood that various changes in the size, shape, construction and arrangement of parts may be made without departing from the spirit of the invention or the scope of the subjoined claims.

I claim:

1. In a plow for use on tractors, a push bar, means for operatively connecting the push bar to the tractor, a plow beam for angular movement about an axis extending transversely of the plow connected to the push bar, a moldboard plow pivotally connected to the beam, and means carried by the push bar and connected with the moldboard plow for controlling the angular movement of the plow on its pivot.

2. In a plow for use on tractors, a push bar comprising a pair of bars secured to each other in face to face relation for the major portion of their lengths, the forward ends of the bars being extended from each other in diverging relation to provide attaching portions, one of the attaching portions being offset whereby both attaching portions lie in the same plane, and a plow beam secured to said attaching portions.

3. The combination with a tractor, of a push bar, means pivotally connecting the rear end of the push bar to the tractor, means for preventing lateral movement of the forward end of the push bar, a plow beam fixedly secured to the forward end of the push bar, a plow, means for pivotally mounting the plow on said plow beam for angular movement about an axis extending transversely of the plow beam, means for controlling the angular movement of the plow, and a lift for the plow including a hand lever and a chain between the hand lever and the plow beam.

4. The combination with a tractor, of a push bar, means for operatively connecting the push bar to the tractor, a plow beam fixedly secured to the push bar, a plow, means for pivotally mounting the plow on said plow beam for angular movement about an axis extending transversely of the plow beam, and means independent of the movement of the push bar for controlling the pivotal movement of said plow.

5. The combination with a tractor, of a push bar, means for pivotally connecting the rear end of the push bar to the tractor, means for preventing lateral movement of the forward end of the bar, a plow beam fixedly secured to the forward end of the push bar, a plow, means for pivotally mounting the plow on said plow beam, for angular movement about an axis extending transversely of the plow, and means independent of the movement of the push bar for controlling the angular movement of the plow.

LEVI C. HESTER.